United States Patent [19]

Oda

[11] Patent Number: 4,519,268
[45] Date of Patent: May 28, 1985

[54] GEAR SHIFT APPARATUS FOR MANUAL TRANSMISSION

[75] Inventor: Masatoshi Oda, Atsugi, Japan

[73] Assignee: Nissan Motor Co., Ltd., Yokohama, Japan

[21] Appl. No.: 472,751

[22] Filed: Mar. 7, 1983

[30] Foreign Application Priority Data

Mar. 9, 1982 [JP] Japan .................. 57-35835

[51] Int. Cl.³ .............................................. G05G 9/12
[52] U.S. Cl. ................... 74/473 P; 248/181; 403/138; 403/144
[58] Field of Search ............ 74/473 P; 200/6 A; 248/181, 288.5, 483; 403/138, 144

[56] References Cited

U.S. PATENT DOCUMENTS

| | | | |
|---|---|---|---|
| 1,896,893 | 2/1933 | Hartstock | 74/473 P |
| 2,174,504 | 9/1939 | Cole | 74/473 P |
| 2,749,161 | 6/1956 | Latzen | 403/138 |
| 3,482,465 | 12/1969 | Lusted | 74/473 P |
| 3,559,501 | 2/1971 | Wieland | 74/476 |
| 3,598,434 | 8/1971 | Patton et al. | 403/138 X |
| 3,850,047 | 11/1974 | Davis | 74/473 P |

FOREIGN PATENT DOCUMENTS

| | | |
|---|---|---|
| 1211495 | 8/1966 | Fed. Rep. of Germany . |
| 1254980 | 11/1967 | Fed. Rep. of Germany . |
| 2940129 | 4/1980 | Fed. Rep. of Germany . |
| 51-25902 | 8/1976 | Japan . |

Primary Examiner—Allan D. Herrmann
Attorney, Agent, or Firm—Schwartz, Jeffery, Schwaab, Mack, Blumenthal & Koch

[57] ABSTRACT

A gear shift apparatus of a manual transmission, consists of a retainer member securely connected to an extension housing connected to a transmission housing. The retainer member is formed with a relatively long hollow cylindrical section a part of which extends into the extension housing. A cylindrical socket member is slidably disposed in the retainer member cylindrical section and biased by a spring in an upward direction. A generally annular support member is disposed inside the cylindrical section. The spherical fulcrum section of a shift lever is supported at both the upper and lower parts respectively by the socket member and the support member. Thus, the shift lever can be effectively supported in suspension, thereby preventing the vibration of shift lever.

12 Claims, 7 Drawing Figures

GEAR SHIFT APPARATUS FOR MANUAL TRANSMISSION

BACKGROUND OF THE INVENTION

1. Field of the Invention

This invention relates generally to a gear shift apparatus of a manual transmission, and more particularly to the gear shift apparatus provided with an improved means for preventing the vibration of a manually operated shift lever.

2. Description of the Prior Art

It is well known in the art that a gear shift apparatus for a gear type manual transmission is provided with a means for preventing the vibration of a shift lever which is operated by a driver. The vibration preventing means, for example, consists of an annular support member by which a ball fulcrum formed at the lower end of the shift lever is pivotally supported. The annular support member is biased by a spring in order to keep shift lever in suspension. However, such a device has mainly encountered the serious problem that the upward and downward movements of the ball fulcrum is restricted to a small extent. This unavoidably limits the upward and downward movements of the shift lever, thereby exhibiting degraded vibration noise preventing effect.

SUMMARY OF THE INVENTION

A gear shift apparatus for a manual transmission according to the present invention consists of a retainer member securely connected to an extension housing connected to a transmission housing and formed with a relatively long hollow cylindrical section a part of which extends into the extension housing. The cylindrical section is formed at its inner peripheral surface with straight grooves. A cylindrical socket member is slidablty disposed in the cylindrical section and has a spherical surface. A spring is interposed between one end portion of the cylindrical section and the socket member to bias the socket member in the upward direction. A stop member is securely disposed at the other end portion of the cylindrical section to restrict the movement of the socket member in the upward direction. A spherical projection is formed at an end of a shift lever and formed with straight grooves. The outer spherical surface of the spherical projection is in slidable contact with the spherical surface of the socket member. The spherical projection is mechanically connected to a transmission mechanism within the transmission housing. An annular support member is disposed on the inner surface of the socket member and formed with a spherical surface in slidable contact with the spherical projection outer surface. Additionally, pins are adapted to pass through the wall section of the socket member and each of which has a first end in engagement with the spherical projection straight grooves, and a second end in engagement with one of the cylindrical section straight grooves.

Accordingly, the axial length of the cylindrical section of the retainer member becomes larger, and consequently it is possible to use the spring of a sufficient length and to allow a higher vibration amplitude of the socket member, thus preventing noise generation. Additionally, since the spherical projection is supported at its both upper and lower parts, it is securely kept in position, thereby achieving a further noise reduction.

BRIEF DESCRIPTION OF THE DRAWINGS

The features and advantages of the gear shift apparatus according to the present invention will be more clearly appreciated from the following description taken in conjunction with the accompanying drawings in which like reference numerals designate like parts and elements, and in which.

DETAILED DESCRIPTION OF THE INVENTION

Figure 1A:
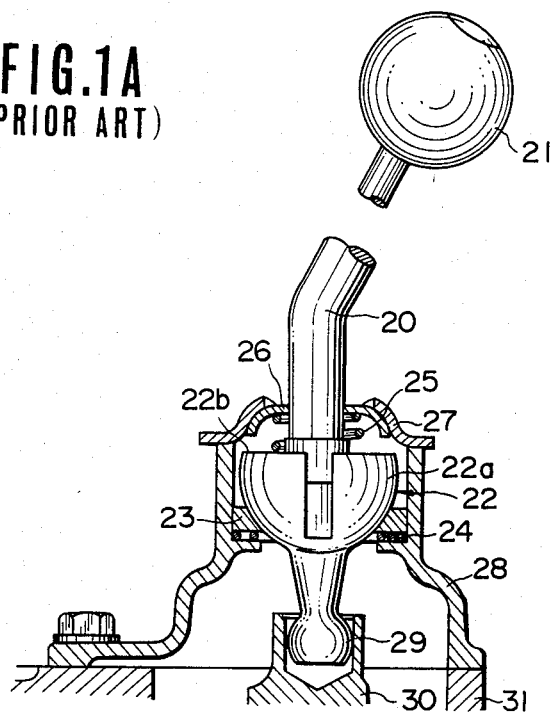
FIGS. 1A and 1B are vertical sectional views of a conventional gear shift apparatus.
Figure 1B:
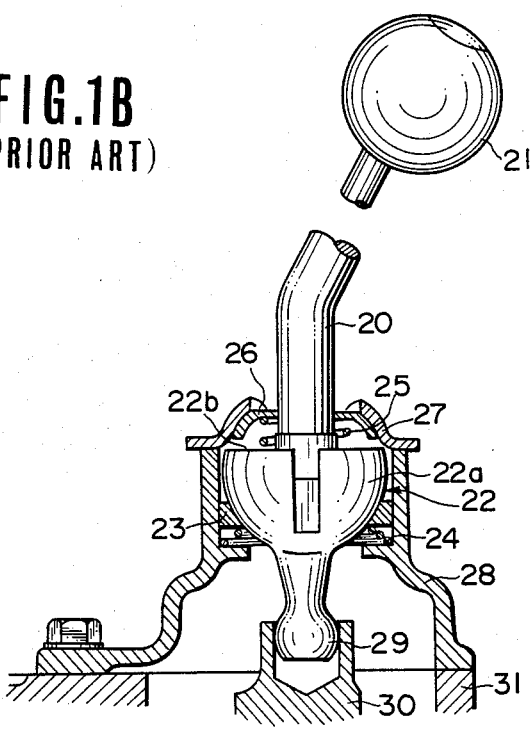

To facilitate understanding the present invention, a brief reference is made to a conventional gear shift apparatus for a gear type manual transmission which is also provided with a means for preventing vibration of a manually operated shift lever 20, as shown in FIGS. 1A and 1B which indicate two operational states of the apparatus, respectively. The shift lever 20 is provided at its upper end with a knob 21 and at its lower end with a ball fulcrum 22. As shown, the ball fulcrum 22 is formed with a hemispherical surface 22a. The ball fulcrum 20 is pivotally supported only at the lower part of the hemispherical surface by a support seat plate 23 which is biased by a lower spring 24. Additionally, the ball fulcrum 22 is supported at its top flat surface 22b by a upper spring 25 which is seated on a valve seat 26 supported on a cap 27. These springs 24 and 25 constitute the vibration preventing means.

With this arrangement, it is required to use pins (not shown) projected from a retainer 28 to prevent the shift lever 20 from its rotation. Additionally, the space above the ball fulcrum top flat surface 22b is smaller which space allows the upward and downward movements of the top flat surface 22b of the ball fulcrum 22 and therefore the following problems have arisen: The upward and downward movements of the shift lever 20 is unavoidably restricted; the springs 24 and 25 are difficult to be set in position; and a restriction is presented in setting a clearance between the gear shift apparatus and the floor of a vehicle body, in selection of an appropriate location of the knob 21 on the shift lever 20, and in selection of the leverage of the shift lever 20. In addition, if the biasing force of the springs 24 and 25 are decreased in order to improve a vibration preventing effect, the support of the shift lever 20 becomes unstable and consequently a baneful influence is exerted upon shift lever operational feeling. In the Figures, the reference numeral 29 denotes a spherical end which is integral with the ball fulcrum 22 and mechanically connected through a movable member 30 to a transmission mechanism (not shown) of the manual transmission.

The reference numeral 31 denotes an extension housing of a transmission housing (not shown).

Figure 2A:
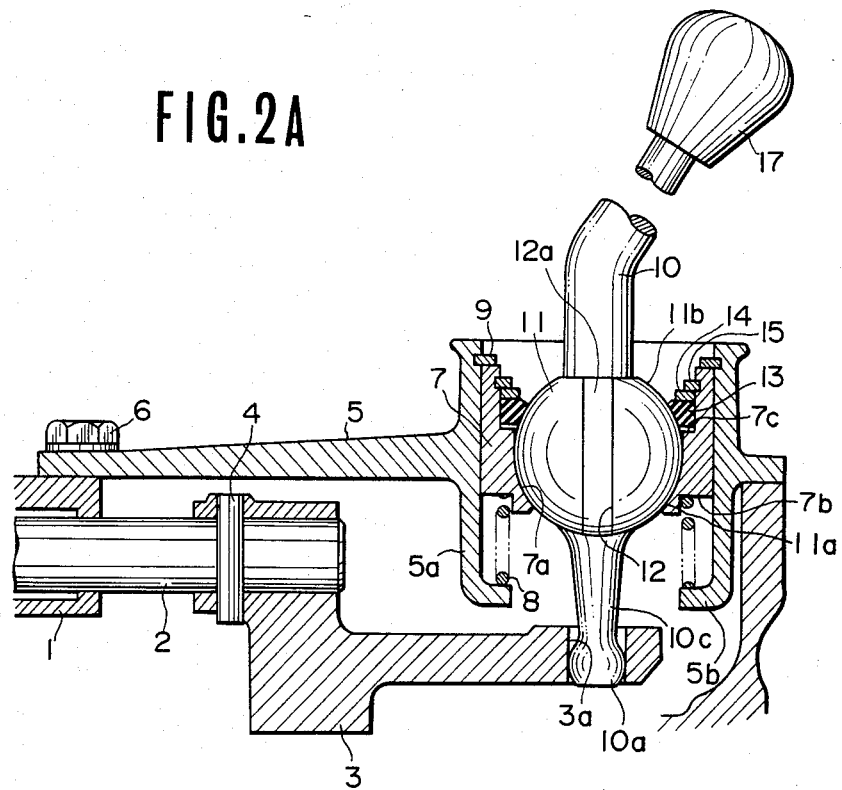
FIG. 2A is a vertical sectional view of a preferred embodiment of a gear shift apparatus in accordance with the present invention.
Figure 2B:
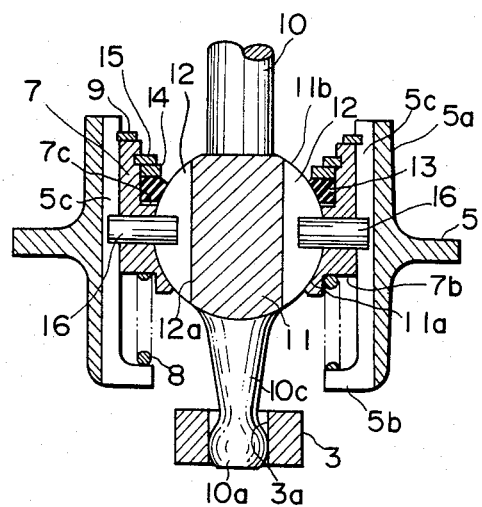
FIG. 2B is a sectional side view of an essential part of the apparatus of FIG. 2A.

In view of the above conventional gear shift apparatus for a manual transmission, reference is now made to FIGS. 2A and 2B wherein a preferred embodiment of a gear shift apparatus of a gear type manual transmission according to the present invention is illustrated. The manual transmission is, in this embodiment, used for an automotive engine. The gear shift apparatus consists of an extension housing 1 which is installed at the rear section of transmission housing (not shown) of the manual transmission. Extended from the inside of the extension housing 1 is a shift and select lever shaft 2 which is mechanically connected to a transmission mechanism (not shown) of the manual transmission. A shift lever housing 3 is secured to an extended or projected end of the lever shaft 2 by means of a spring pin 4.

A retainer 5 is disposed at the upper opened section of the extension housing 1 and rigidly connected thereto by bolts 6. The retainer 5 is formed with a hollow cylindrical section 5a whose axis, in this embodiment, is generally perpendicular to the surface of the retainer 5. As shown, a generally lower half part of the cylindrical section 5a is located below the retainer or within the extension housing 1. A generally cylindrical socket member 7 is slidably disposed within the cylindrical section 5a or in slidable contact with the inner cylindrical surface of the cylindrical section 5a. The socket member 7 is formed at its bottom with an annular cutout portion 7b which is located opposite an annular seat portion 5b formed at the bottom of the cylindrical section 5a. A spring 8 is interposed between the surface of the socket member cutout portion 7b and the upper surface of the seat portion 5b. An annular stop member or snap ring 9 is secured on the inner surface of the cylindrical section 5a at the upper section in order to restrict the upward movement of the socket member 7.

A shift lever 10 is provided at its upper end with a knob 17 and formed at its lower end or pivotally supported section with a ball fulcrum or spherical projection 11. The spherical projection 11 is formed on its spherical surface with two vertical grooves 12 which are opposite to each other relative to the center of the spherical projection 11. The vertical grooves 12 are so formed that the bottom surface 12a thereof extends parallel with the axis of the cylindrical section 5a in the state shown in FIGS. 2A and 2B. The spherical projection 11 is supported at its lower part 11a by the spherical support seat face 7a of the socket member 7, and at its upper part 11b by the spherical seat face of an annular seat member 13. The annular seat member 13 in this embodiment is formed of a resilient material such as Nylon, otherwise may be formed a rigid material. The seat member 13 is located on an annular offset portion 7c of the socket member 7. As shown, an annular washer 14 is interposed between the upper surface of the seat member 13 and a snap ring 15 secured to the inner surface of the socket member 7 at the upper portion. It is preferable that a clearance is formed between the bottom surface of the seat member 13 and the surface of the socket member offset portion 7c opposite the seat member bottom surface.

Two pins 16 are press-fitted and disposed passing through the cylindrical side wall of the socket member 7 at the opposite portions. An end portion of each pin 16 is in slidable engagement with or inserted into the vertical groove 12 of the spherical projection 11, and the other end is in slidable engagement with or inserted into a vertical groove 5c formed on the inner surface of the hollow cylindrical section 5a of the retainer 5. The vertical groove 5c extends parallel with the axis of the cylindrical section 5a. Another vertical groove 5c is formed opposite the vertical groove 5c relative to the axis of the cylindrical section 5a. A spherical end section 10a is securely connected to the spherical projection 11 through a downwardly extended connecting section 10c. The spherical end section 10a is pivotally disposed within a hole 3a of the shift lever housing 3.

The manner of operation of the thus arranged gear shift apparatus will be discussed hereinafter.

In order to make the gear shift operation of the manual transmission, the knob 17 is moved in the forward and rearward directions and in the rightward and leftward directions by a driver. Then, the shift lever 10 is tilted about the spherical projection 11 serving as a fulcrum, and consequently a required shift gear of the transmission mechanism is selected through the spherical end section 10a, the hole 3a, the shift lever housing 3 and the shift and select lever shaft 2.

Now, during vehicle cruising, engine vibration and vehicle body vibration are transmitted to the extension housing 1 and the retainer 5 which are connected to the transmission housing. However, the socket member 7 is slidably movable relative to the retainer cylindrical section 5a, and the bottom portion of the socket member 7 is elastically supported by the spring 8, and therefore the above-mentioned vibrations are not transmitted to the socket member 5a. It is to be noted that since the lower part of the retainer cylindrical section 5a is formed projecting into the extension housing 1 and the upper part thereof is formed integral with the lower part, the axial length of the retainer cylindrical section 5a becomes larger. This allows to use the spring having a sufficient length and to increase the vibration amplitude of the socket member 7 in the upward and downward directions. Additionally, the shift lever 10 is tiltable in forward and rearward directions and in the rightward and leftward directions but securely prevented from its rotational movement by virtue of the engagement of the pins 16 with the vertical grooves 12 and 5c. Since the pins 16 press-fitted in the socket member 7 are slidable in the upward and downward directions within the vertical grooves 5c, the shift lever 10 and the socket 7 are freely allowed to move upward and downward.

Figure 3A:
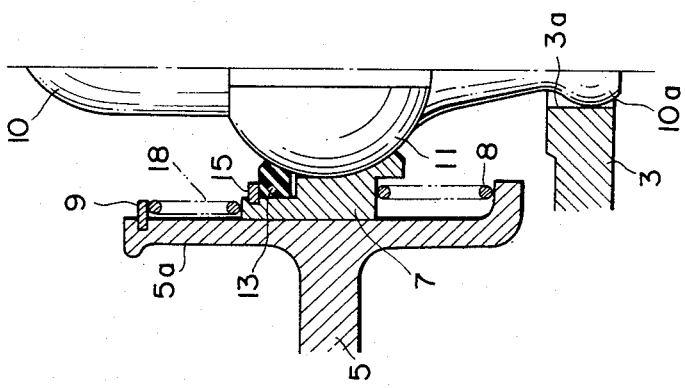
FIG. 3A is a partially sectional view of a modified example of the apparatus according to the present invention.

FIG. 3A shows a modified example of the gear shift apparatus according to the present invention, in which a coil spring 18 is interposed between the upper end of the socket member 7 and the snap ring 9. Accordingly, the socket member 7 and the shift lever 10 can be maintained completely in suspension. This is effective particularly to improve the vibration suppression effect and operational feeling of the shift lever 10.

Figure 3B:
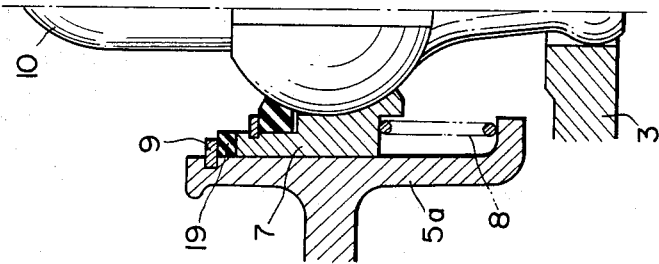
FIG. 3B is a partially sectional view similar to FIG. 3A, but showing another modified example of the apparatus according to the present invention.

FIG. 3B shows another modified example of the gear shift apparatus according to the present invention, which is similar to the example of FIG. 3A with the exception that a ring-shaped resilient member 19 formed of rubber or the like is used in place of the spring 18. Accordingly, the socket 7 strikes against the snap ring 9 through the resilient member 19, thereby damping the shock of the socket 7 at the upper-most position thereof.

Figure 3C:
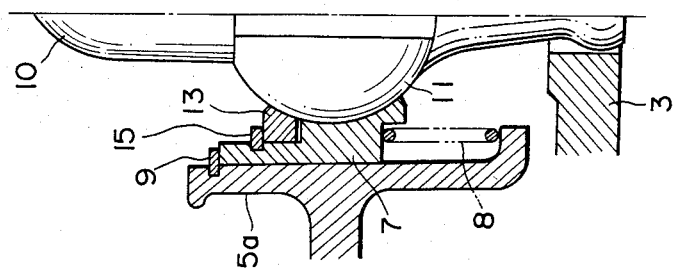
FIG. 3C is a partially sectional view similar to FIG. 3A, but showing a further modified example of the apparatus according to the present invention.

FIG. 3C shows a further modified example of the gear shift apparatus according to the present invention, in which the annular seat member 13 is made of a rigid material. Also in this example, when the hand of the driver is put on the knob 17, the shift lever 10 is slightly pushed down by the weight of a driver's arm and consequently the shift lever 10 is kept in suspension under the action of the spring 8. This presents substantially the same effect as in the above-mentioned embodiments and modified examples.

As will be appreciated from the above, according to the present invention, the hollow cylindrical section of the retainer member is formed larger in axial length, and therefore it becomes possible to use the spring of a sufficient length and to allow a higher vibration amplitude of the socket member. Furthermore, the pivotally supported section of the shift lever is generally spherical and supported at both the upper and lower portions on two separate spherical surfaces, thereby achieving a secure support of the shift lever. Thus, the vibration preventing effect to the shift lever is improved without degrading the operational feeling of the shift lever. Moreover, since a considerably large space is formed above the support section of the shift lever, the moving amount of the shift lever becomes larger while facilitating installation of the spring, the selection of an appropriate location of the knob of the shift lever, the selection of clearance between the gear shift apparatus and a vehicle body floor, and the selection of the leverage of the shift lever.

What is claimed is:

1. A gear shift apparatus for a manual transmission, comprising:

a retainer member securely connected to an extension housing connected to a transmission housing and formed with a hollow cylindrical section a part of which extends into said extension housing, said cylindrical section being formed at its inner peripheral surface with straight grooves;

a cylindrical socket member slidably disposed in said cylindrical section and having a spherical surface;

a first spring interposed between one end portion of said cylindrical section and said socket member to bias said socket member in a direction;

a first stop member securely disposed at the other end portion of said cylindrical section to restrict the movement of said socket member in said direction;

a spherical projection formed at its pivotally supported section of a shift lever and formed with straight grooves, the outer spherical surface of said spherical projection being in slidable contact with the spherical surface of said socket member, said spherical projection being mechanically connected to a transmission mechanism of the transmission;

an annular support member disposed on the inner surface of said socket member and formed with a spherical surface in slidable contact with the spherical projection outer surface; and pins passing through the wall section of said socket member and each of which has a first end in engagement with said spherical projection straight grooves, and a second end in engagement with one of said cylindrical section vertical grooves.

2. A gear shift apparatus as claimed in claim 1, further comprising a second stop member for maintaining said support member in contact with said socket member, said second stop member being secured to said socket member.

3. A gear shift apparatus as claimed in claim 2, wherein said socket member is formed at its inner peripheral surface with a first cutout section in which said support member is disposed in contact with said socket member.

4. A gear shift apparatus as claimed in claim 3, wherein said socket member is formed at its outer peripheral surface with a second cutout section in which one end of said first spring is located, the other end of said first spring being located on an annular seat portion formed integral with said retainer member cylindrical section.

5. A gear shift apparatus as claimed in claim 1, wherein the straight grooves of said retainer member cylindrical section are two vertical grooves which are located opposite to each other relative to the axis of said retainer member cylindrical section and extend parallel with the cylindrical section axis.

6. A gear shift apparatus as claimed in claim 5, wherein the straight grooves of said spherical projection are two substantially vertical grooves which are capable of being parallel with said cylindrical section vertical grooves.

7. A gear shift apparatus as claimed in claim 6, wherein said pins are two straight pins which are so located that the axes thereof intersect the axis of said retainer member cylindrical section.

8. A gear shift apparatus as claimed in claim 2, wherein said support member is made of a resilient material.

9. A gear shift apparatus as claimed in claim 8, further comprising a washer member interposed between said support member and said second stop member.

10. A gear shift apparatus as claimed in claim 8, further comprising a second spring interposed between said first stop member and said socket member.

11. A gear shift apparatus as claimed in claim 8, further comprising a resilient member interposed between said first stop member and said socket member.

12. A gear shift apparatus as claimed in claim 2, wherein said support member is made of a rigid material.

* * * * *